United States Patent Office 3,582,358
Patented June 1, 1971

3,582,358
PEANUT BUTTER AND JELLY COMBINATION
Robert H. Bundus, Riverside, Ill., assignor to Beatrice Foods Co., Chicago, Ill.
Filed Dec. 6, 1967, Ser. No. 688,311
Int. Cl. A23l 1/38
U.S. Cl. 99—128                                    8 Claims

ABSTRACT OF THE DISCLOSURE

Water-in-oil emulsifiers are added to peanut butter and the peanut butter is then stable when in contact with jelly, jam or marshmallow. Some oil-in-water emulsifier can be included to obtain increased stiffness of the peanut butter.

---

The present invention relates to a stable peanut butter and jelly, jam or marshmallow combination.

Colby Pat. 3,278,314 discloses a combination of peanut butter and jelly, jam or marshmallow containing a low molecular weight sugar, e.g., dextrose. The peanut butter and jelly, or the like, are swirled together. It is critical to employ the proper sugar mixture to keep the system stable. The reason the low molecular weight sugar is added to the jelly is because moisture migrates from the jelly to the peanut butter, resulting in sugar crystallization and discoloration of the peanut butter. Such a system unfortunately requires the modification of the jelly, jam or marshmallow by the addition of the low molecular weight carbohydrate.

It is an object of the present invention to make an improved, stabilized peanut butter and jelly, jam or marshmallow combination.

Another object is to prepare a peanut butter and jelly combination which does not require any alteration of the jelly.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that there is no need to modify the jelly, jam or marshmallow. Peanut butter is basically a continuous oil phase system which is normally hydrophobic. This would not cause moisture migration from the jelly to the peanut butter. However, in order to maintain the fat stability in the peanut butter there is normally added an oil-in-water emulsifier, specifically mono and diglycerides. This oil-in-water emulsifier draws the moisture from the jelly to the peanut butter and renders it unstable.

It has been found that the stability of the peanut butter can be preserved without modifying the jelly, jam or marshmallow by employing a water-in-oil emulsifier in the peanut butter. Typical examples of suitable water-in-oil emulsifiers include Centrophil IM (a lecithin high in cephalin and also containing lipositol and inositol phosphatides), sorbitan partial esters of higher fatty acids such as Span-60 (sorbitan stearate e.g., 10–10–S (decaglycerol descastearate), decaglycerol decaoleate, hexaglycerol hexastearate, decaglycerol decapalmitate, etc. The emulsifier should have more lipophilic than hydrophilic groups. Any non-toxic water-in-oil emulsifier can be used.

Unless otherwise indicated all parts and percentages are by weight.

In a specific example the addition of 3% Centrophil IM to peanut butter prevented fat separation in the peanut butter and eliminated moisture migration to the peanut butter from an adjacent layer of jelly, e.g., apple jelly.

A control made from layers of peanut butter without any emulsifier and jelly resisted moisture migration but had some oil separation. When the peanut butter had added thereto mono and diglycerides there was considerable migration of moisture from the jelly to the peanut butter with visible discoloration of the peanut butter to a depth of $3/16$ inch.

The peanut butter and jelly are not in intimate admixture but instead are stratified in contacting layers. The layer can either be vertical or horizontal or they can be swirled, e.g., to give a vertically disposed spiral design.

The volume of peanut butter to jelly, jam or marshmallow can be from about 25:75 to about 95:5 but this is not a critical limitation.

Any jelly can be employed, e.g., apple jelly, grape jelly, raspberry jelly, plum jelly, blackberry jelly, blueberry jelly, apricot jelly, strawberry jelly, guava jelly, peach jelly, quince jelly, or the like. Similarly, there can be used any type of jam such as strawberry jam, raspberry jam, blackberry, jam, peach preserves, blackberry jam, apricot jam, etc. Regular or chocolate or other flavored marshmallows can be used. The problem encountered with marshmallows is normally even greater than with jelly and the use of the water-in-oil emulsifiers eliminates this aggravated situation.

The peanut butter can be prepared in a conventional fashion with the water-in-oil emulsifier being added to the peanut butter in its manufacture.

The water-in-oil emulsifiers frequently give a peanut butter product lacking in body (stiffness) as compared to mono and diglyceride emulsified peanut butter. It has further been found that this problem can be overcome by using a mixture of the water-in-oil emulsifier and mono and diglycerides or similar oil-in-water emulsifier. Preferably the water-in-oil emulsifier is used in an amount at least equal to the mono and diglycerides. The water-in-oil emulsifier is usually employed in an amount of 0.5 to 5%, based on the weight of the peanut butter composition.

In a specific example using a mixture of emulsifiers there was employed 0.5% mono and diglycerides and 1.5% Centrophil IM based on the peanut butter and the peanut butter was placed in juxtaposition to a layer of grape jelly. There was no migration of water to the peanut butter, the peanut butter was stable and was quite stiff.

Further examples are given below:

EXAMPLE 1

|  | Percent |
|---|---|
| Salt | 1.4 |
| Dextrose | 3.5 |
| Span 60 | 1.0 |
| Ground peanuts | 94.1 |

The above ingredients were mixed together in conventional manner to form a homogeneous mixture to form a peanut butter. The mixture was heated to 70° C. (158° F.) to make sure the fats were melted. The mixture was then ready to be introduced into the common container for the peanut butter and jelly. (The peanut butter mixture can be cooled, e.g. to 140° F. prior to introduction into the common container but this is not necessary.) After a layer of the peanut butter was placed in the container there was placed a layer of apple jelly thereover and this process was continued until the jar was filled.

EXAMPLE 2

| | Percent |
|---|---|
| Salt | 1.4 |
| Dextrose | 3.5 |
| Emulsifier | 2.0 |
| Ground peanuts | 93.1 |

Peanut butter was prepared in the manner described in Example 1 and then placed in a container and a layer of grape jelly placed thereover. The penetration of the jelly into the peanut butter was measured over a 20 day period. The best emulsifier was Centrophil IM and the second best was 10–10–S. In both of these cases using 2.0% of the emulsifier the penetration of jelly into the peanut butter was less than ⅛ inch. In contrast when there was employed regular peanut butter containing 2.5% of Myverol 1807 (a commercial mono and diglyceride mixture) the penetration was ⅜ inch.

EXAMPLE 3

| | Grams |
|---|---|
| Salt | 4.2 |
| Dextrose | 10.5 |
| Myverol 1807 | 1.5 |
| Centrophil IM | 6.0 |
| Ground peanuts | 277.8 |

The peanut butter was prepared in the manner prepared in Example 1 and then placed in a container and a layer of grape jelly placed thereover. In the 20 day test there was little migration of the jelly into the peanut butter.

In this example the Myverol 1807 was 0.5% and the Centrophil IM 2% of the total peanut butter. When the quantities of these two emulsifiers were changed so that the composition contained 1% Myverol 1807 and 1% of Centrophil IM there was a significant increase in the penetration of the jelly into the peanut butter.

Centrophil IM is a lecithin in a peanut oil vehicle. When the Centrophil IM was replaced by a proportional weight of Centrophil I (the same as Centrophil IM except the peanut oil is omitted) even better results were obtained in Examples 2 and 3.

The jelly layer in each of the examples can be replaced by marshmallow to obtain a stable product.

What is claimed is:

1. An oil stable peanut butter emulsion containing a water-in-oil emulsifier having more lipophilic than hydrophilic groups in juxtaposition to a food consisting essentially of unmodified jelly, jam or marshmallow whereby the migration of moisture from said food to the peanut butter emulsion is reduced, said emulsifier being present in the amount of 0.5 to 5% by weight of the peanut butter and including an oil-in-water emulsifier in an amount not exceeding said water in oil emulsifier.

2. A product according to claim 1 wherein the oil-in-water emulsifier is mono and diglycerides.

3. A product according to claim 2 wherein the water-in-oil emulsifier comprises lecithin or a polyglycerol partial ester of a higher fatty acid.

4. A product according to claim 1 wherein the food is jelly.

5. A product according to claim 1 wherein the food is marshmallow.

6. A product according to claim 1 wherein the emulsifier comprises lecithin.

7. A product according to claim 1 wherein the emulsifier comprises a polyglycerol partial ester of a higher fatty acid.

8. A product according to claim 7 wherein the emulsifier is decaglycerol decastearate.

References Cited

UNITED STATES PATENTS

| | | | |
|---|---|---|---|
| 2,397,564 | 4/1946 | Rosefield | 99—128 |
| 2,447,387 | 8/1948 | Avers | 99—128 |
| 2,811,136 | 6/1950 | Vincent | 99—128 |
| 2,560,509 | 7/1951 | Harris | 99—128 |
| 3,117,871 | 1/1964 | Bahr | 99—128 |
| 3,245,803 | 4/1966 | Baker | 99—128 |
| 3,278,314 | 10/1966 | Colby | 99—128 |

FRANK W. LUTTER, Primary Examiner

R. HALPER, Assistant Examiner